United States Patent
Harris

(10) Patent No.: US 11,252,280 B2
(45) Date of Patent: Feb. 15, 2022

(54) CONVEYOR CALL CENTER WITH CRYPTOGRAPHIC LEDGER

(71) Applicant: Scott C Harris, San Diego, CA (US)

(72) Inventor: Scott C Harris, San Diego, CA (US)

(*) Notice: Subject to any disclaimer, the term of this patent is extended or adjusted under 35 U.S.C. 154(b) by 0 days.

(21) Appl. No.: 16/704,611

(22) Filed: Dec. 5, 2019

(65) Prior Publication Data

US 2021/0176359 A1 Jun. 10, 2021

(51) Int. Cl.
| | |
|---|---|
| *H04M 3/00* | (2006.01) |
| *H04M 3/51* | (2006.01) |
| *H04L 9/06* | (2006.01) |
| *H04M 3/523* | (2006.01) |
| *H04M 3/42* | (2006.01) |
| *G10L 13/00* | (2006.01) |

(52) U.S. Cl.
CPC ........... *H04M 3/5183* (2013.01); *G10L 13/00* (2013.01); *H04L 9/0637* (2013.01); *H04M 3/42042* (2013.01); *H04M 3/5232* (2013.01)

(58) Field of Classification Search
CPC ....................................................... G10L 3/00
USPC ....... 379/266.01–266.1, 265.01–265.14, 309
See application file for complete search history.

(56) References Cited

U.S. PATENT DOCUMENTS

| | | | | | |
|---|---|---|---|---|---|
| 4,697,282 A | * | 9/1987 | Winter | ..................... | H04M 3/53 379/213.01 |
| 7,565,243 B2 | * | 7/2009 | Kim | ....................... | G01V 1/302 702/2 |
| 7,844,045 B2 | * | 11/2010 | Contolini | ............ | H04M 3/5232 379/265.12 |
| 9,444,940 B2 | * | 9/2016 | Skiba | ................... | H04M 3/5233 |
| 9,692,895 B1 | * | 6/2017 | Ouimette | ............ | H04M 3/5175 |
| 9,710,819 B2 | * | 7/2017 | Cloran | .................... | G06Q 30/02 |
| 10,726,847 B1 | * | 7/2020 | Hardage | ............... | H04M 3/523 |
| 10,742,813 B2 | * | 8/2020 | Copeland | ............... | G06N 3/006 |
| 10,932,608 B2 | * | 3/2021 | Hsu | ........................ | B01D 29/05 |
| 11,120,812 B1 | * | 9/2021 | Shi | ........................ | G10L 21/013 |
| 11,157,695 B1 | * | 10/2021 | Shi | ......................... | G06F 40/30 |
| 2003/0215066 A1 | * | 11/2003 | Shambaugh | .......... | H04M 3/523 379/88.13 |
| 2005/0286705 A1 | * | 12/2005 | Contolini | ............ | H04M 3/5232 379/265.02 |
| 2006/0215831 A1 | * | 9/2006 | Knott | ..................... | H04M 3/493 379/211.02 |
| 2009/0150225 A1 | * | 6/2009 | Knott | .................. | G06Q 30/0203 705/7.13 |
| 2009/0271205 A1 | * | 10/2009 | Finn | .................... | G06Q 30/0281 705/346 |

(Continued)

*Primary Examiner* — William J Deane, Jr.

(57) ABSTRACT

A system of handling callers, uses a computer, that receives a call, assigns an operator to handle the call, and automatically recognizes at least one aspect of a voice from a caller, and automatically forms a response to be given to the caller. The caller is prevented from knowing they are speaking with a computer by receiving responses from multiple different similar sounding operators. The computer providing sound to the caller which interferes with the caller being able to determine that the caller has been placed on hold from the operator, e.g., an average of multiple people talking in the background. The computer also maintains a ledger of the call, where the ledger includes information about recognized voice from the caller, and responses which were given to the caller, for each of a plurality of exchanges which occur during the call and distributes that ledger.

20 Claims, 2 Drawing Sheets

(56) References Cited

U.S. PATENT DOCUMENTS

| | | | | |
|---|---|---|---|---|
| 2009/0300041 | A1* | 12/2009 | Schroeter | G10L 13/06 |
| 2014/0372755 | A1* | 12/2014 | Ristock | H04L 47/286 |
| | | | | 713/168 |
| 2016/0371703 | A1* | 12/2016 | Mon | H04L 67/306 |
| 2017/0337122 | A1* | 11/2017 | Bolajwar | G06F 11/34 |
| 2018/0146097 | A1* | 5/2018 | Bender | H04M 3/367 |
| 2018/0288225 | A1* | 10/2018 | Fang | H04M 3/5166 |
| 2018/0367672 | A1* | 12/2018 | Ristock | H04M 3/365 |
| 2018/0376002 | A1* | 12/2018 | Abraham | H04M 3/5166 |
| 2019/0082043 | A1* | 3/2019 | Lavian | H04M 1/2477 |
| 2020/0322399 | A1* | 10/2020 | Cohen | G06Q 30/0201 |
| 2020/0327619 | A1* | 10/2020 | Beaver | G06Q 30/0242 |

* cited by examiner

CONVEYOR CALL CENTER WITH CRYPTOGRAPHIC LEDGER

BACKGROUND

Some people don't like the Internet. For many of those people, there is an inherent mistrust about that's interacting with a computer, rather than interacting with a live person.

Certain companies, however, recognize the demographics of those people and give the best prices only to those who operate over the Internet. There is an economic justification for that, in that it is inefficient for operators to attend to phone calls while people attempt to get their points across, including saying "um", and wasting time while they think about their answers.

SUMMARY

The present application describes an operator conveyor system which hands off information between operators and computers, in a way that allows the operators to talk with the callers, while getting internet/computer based information in the background about the results of any caller requests. This is done using a "conveyor", in a way that hides from the caller that they are actually interacting with the computer, rather than interacting with a human operator.

Another aspect describes a "ledger" that maintains records about the interaction(s) of the phone calls, and provides a computer summary of the phone call along with some verification of that computer summary.

BRIEF DESCRIPTION OF THE DRAWINGS

The drawings show aspects of the invention as described herein, wherein.

DETAILED DESCRIPTION

The present application describes a system which attempts to make a call center system as efficient as possible from the point of view of the telephone operator, but also makes it seamless from the point of view of the caller.

According to an embodiment, actions are taken to prevent the caller from realizing that the caller is being timeshared and that the operator is changing people and pausing between responses.

Figure 1:
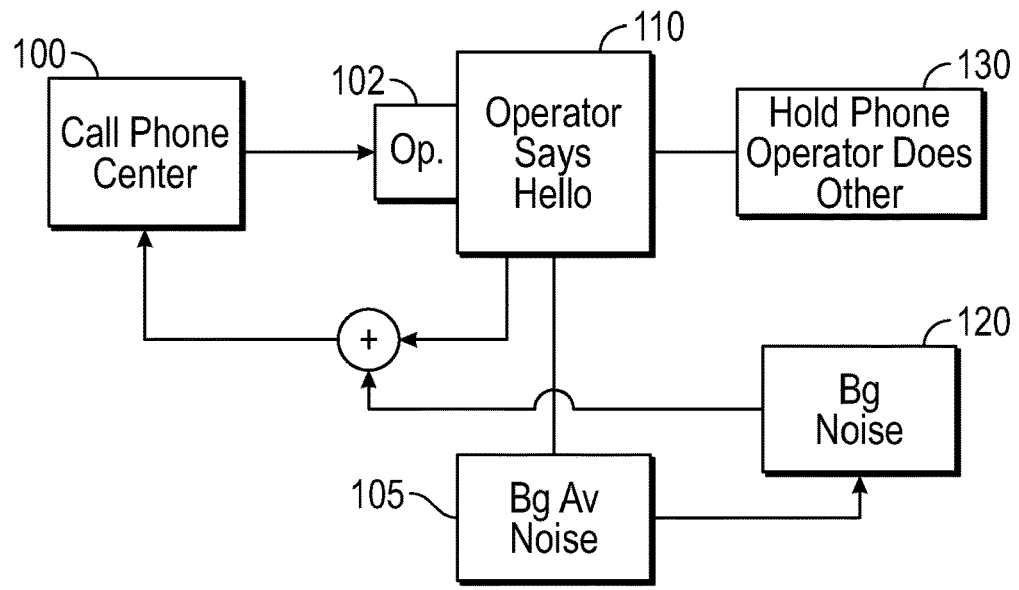
FIG. 1 shows an overall flowchart of operation.
Figure 2:
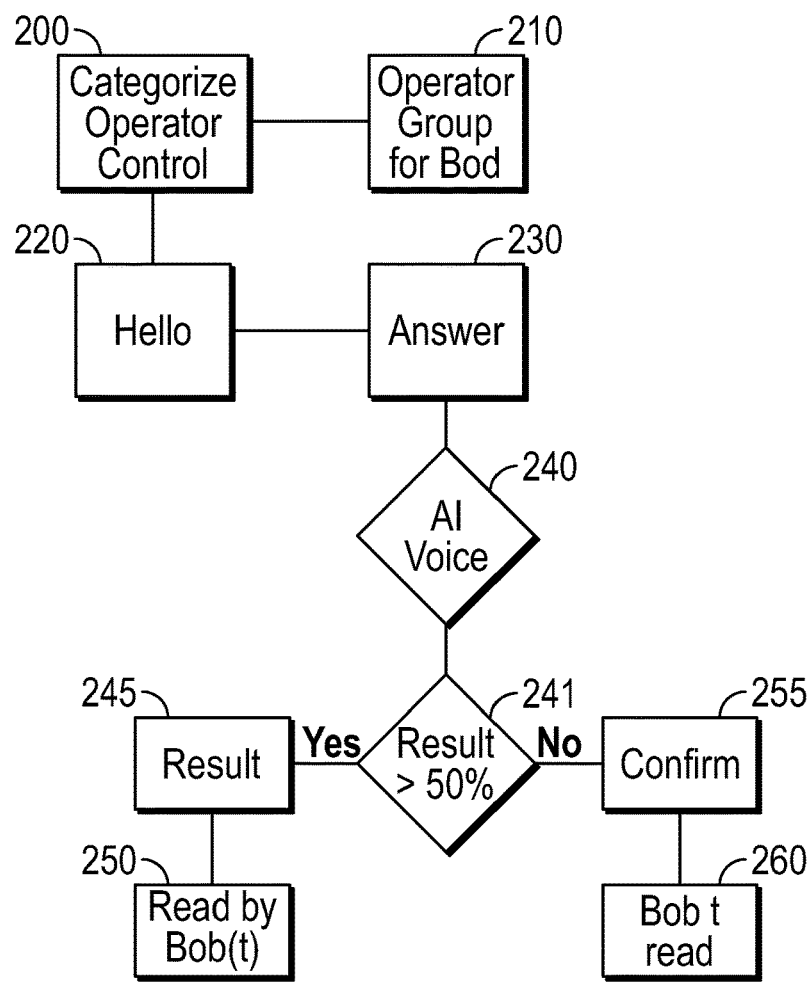
FIG. 2 shows a flowchart of determining which operator will talk.
Figure 3:
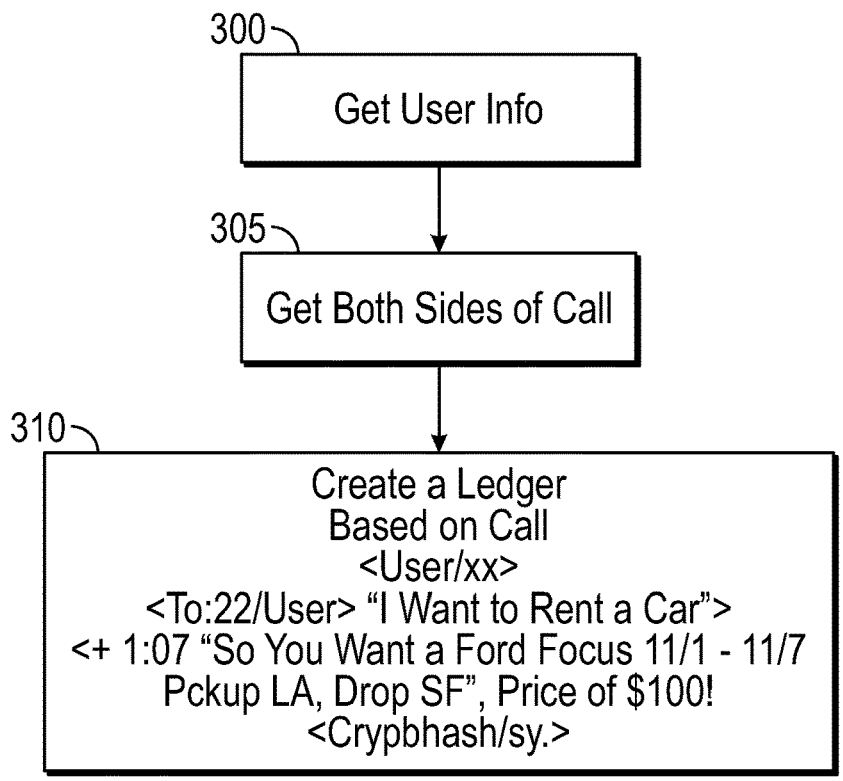
FIG. 3 shows a flowchart of creating a ledger.
Figure 4:
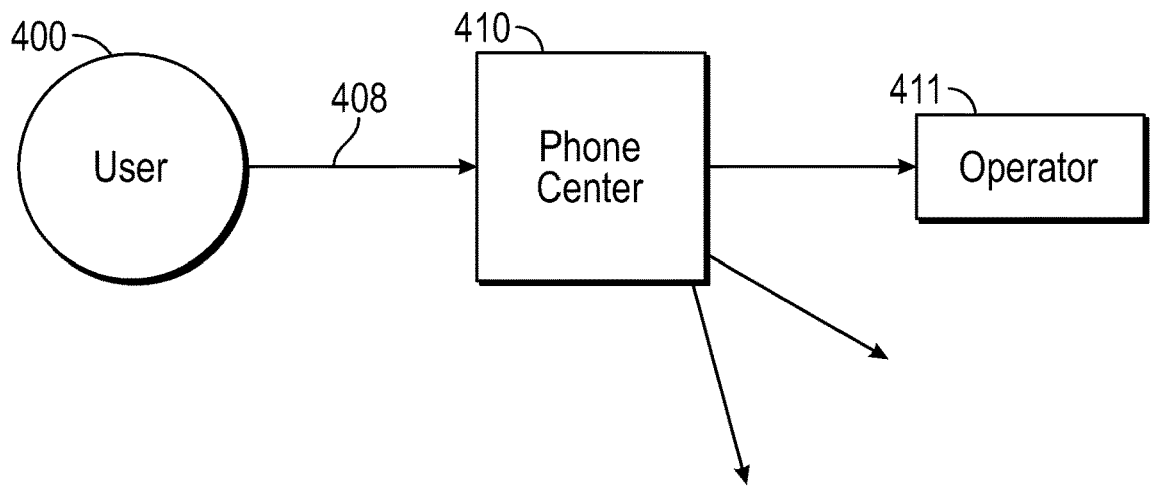
FIG. 4 shows a block diagram of the system.

FIG. 1 illustrates a basic embodiment. The user at 100 calls a phone center. The phone center is a calling center which may have connections to many human operators.

Upon calling the phone center, the user is assigned an operator at 102.

The user receives a message from the operator of "hello", at 110, which may also identify the call center.

It is common for users to hear background noise, from the background of the call center, during their interaction with her operator. Accordingly, the present application assumes that users will hear background noise each time they hear from the operator. According to an embodiment, the system records and averages background noise at 120, and adds that background noise into all aspects of what the user is hearing, both during the time the operator talks, and also during the time that the operator is being removed from the phone.

Hence, the users hear the background noise in the background of the operator. Once the operator says hello, and in between each time the operator talks, the user is essentially placed on hold so the operator can do something else during this time. However, the user might not recognize that they are placed on hold, because during the time they are placed on hold, the averaged noise is being played at 120 to the user. When the operator says hello, that background noise will be added in to the existing background noise, and hence the user, will not hear any difference.

Other actions can also be taken to average the noise and prevent the user from determining that they have been put on hold.

This system relies on use of canned phrases by the operators which have been previously recorded. The operator may say hello at 110, or alternatively, this can be a previously recorded version of the operator saying hello at 110. The system then switches to a hold phone mode at 130, in which the operator is taken off-line, and placed onto another task, during which time the background noise continues to be played to the user.

In one embodiment, the basic operation at 102 of assigning an operator includes assignment of a real operator, for example operator number 101. Operator number 101 is also categorized according to the operator's voice to form an operator group. The voice may be characterized according to: male or female, accent if any, timbre and pitch of the operator's voice, another characterizations of the way the operator will be heard by a listener.

Based on the characterization at 200, an operator group A is defined, which corresponds to a group of different operators who have a similar enough voice that they may sound similar to operator 101. This means that anyone from operator group a can talk to the user, with of less chance of the user noticing that the operator has changed. This relies on grouping by similar sounding people who will answer the phone, so that even if a different operator needs to talk the next time, the user may not notice it especially since the noise is being played in the background.

The call is assigned to an operator, who has availability at the time. For example, operators may be simultaneously working on 3 or 4 calls, because a lot of the time will be idle in the call, while the user is talking, and while the system is playing canned responses, as described herein.

Assume the call gets assigned to operator Bob. Bob (or a recording of Bob) says at this point 'hello, how can I help you'.

At 220, Bob has issued an introductory comment, either directly, or using a tape or prerecorded voice.

The party will answer at 230, and the answer may be any of a number of different things. Examples may include: I want my account balance; I want to rent a car; I want to buy a car; I want to find a pet wash.

At 240, an "artificial intelligence" style recognition of the answer is carried out. This may use an "Alexa" or "Siri" style of artificial intelligence to try to determine what the user is saying in their answer at 230.

A "result" is then obtained from that user's answer, based on attempting to understand the answer. At 241 the system determines a probability that the phrase that was understood was correct. If the probable result accuracy is very high, in this embodiment if the result accuracy over 80% confident that the result has been properly recognized, the system may automatically use this artificial intelligence engine (such as Alexa engine, or a Siri type engine), to look up an answer to the question. If the result is greater than 80%, the engine will return a result to Bob at 245. At Bob's next chance, the operator Bob will read the result to the user at 250, and ask any follow up question. For example, if the question is "what is my balance", Bob can read the balance to the user, and say 'is there anything else I can help you with'. If the question is 'how can I get a Ford Aerostar for the cheapest price", Bob can read the answer (e,g., order it from our factory car service . . . ") to the user, and then ask, "Can I get the process started for you?"). Any answer is read based on a script that is displayed to Bob, based on the question asked by user x.

If Bob is "busy" at the time of the answer, then the answer can be sent to another member of Bob's group, and hence the reading in the flowchart is shown as being read by "Bob +", meaning Bob or a member of Bob's group.

If the result at 241 is less than 80%, this means the system has less confidence in the accuracy of the recognition. At this point, then a confirmation is read by Bob+, to the user, such as 'I think you want to know X, is that correct?' at 255. If so, the answer is read at 260, if not, the answer may be listened by a live attendant to attempt to understand it.

Each operator or operator group may have a set of canned responses. The operator will only speak when there is a speech event that requires an operator's live response. The speech event will preferably use the operator that was assigned the call, or if that operator is not available, then another operator from their group is used.

In an embodiment, Person A calls the call center and asks a question, "what's the weather going to be today?". If the AI understands it, it may simply sends a description of the weather the operator (Bob), who reads the weather.

If the question is something that gets asked often, such as "what time does the store close today", then Bob may have recorded himself saying the answer, such as "the store closes today at 5 o'clock". Bob's "canned response" is then read to the user, who preferably and in most circumstances will not know that they are receiving a recorded version of Bob's response.

If the AI thinks that its confidence in understanding Person A's question is less than 80%, it may have Bob read back the probable question, such as "I think you want to know what the weather is today is that right? If Person A says yes, then an answer is provided to Person A, either via a speech event if the answer is somewhat unique, or by playing a canned response if the answer is one that gets used all the time.

Hence, the system can either play a canned response or have the operator say the answer. Bob does not have to speak until there has to be a speech event, all other responses can be handled via canned responses.

An alternative flow may start with Bob saying, using a canned response, "hello, who am I speaking to", or, using caller ID to recognize the person, "hello am I my speaking to Person A"? This latter question may have to be read by Bob himself, unless Bob has recorded canned responses for each of a plurality of users.

At this point, the caller answers and says an answer, their name, or yes, it me.

An AI voice interpret is used to determine what the person is saying. People who don't want to talk to a computer do not know that they're talking to a computer at this point, because all the time there is background noise being averaged in in the background both during the times that the person is speaking, and during the time that the person is on hold. This can go back and forth, asking the user what they want to do, recognizing their answer, and forwarding them on with additional information obtained from the artificial intelligence, or the like.

This system can be used to obtain any kind of information, particularly information that is available on a database or the Internet, with the user talking to a telephone system instead of talking instead of using the Internet. Examples of this include, scenarios as described herein.

A first scenario, the user initially says "I want to rent a car". The system answers and says "tell me more, firstwhere you want to pick the car up?" This can be a canned response, based on a taped response by Bob, since any time somebody calls Bob and says they want to rent a car, Bob may automatically answer where you want to return it and/or where you want to pick it up.

The user answers, and says Los Angeles. Bob then responds with his next canned answer, do you want to drop it off at the same location? Again the user answers. "Do you have a car preference" again the user answers; are there any other preferences, or you just want the cheapest car again the user answers. At any time during this, the user may also say something off script, but the AI will automatically determine what the user is saying and attempt to deal with what user is saying, either with a canned answer or by getting Bob, or Bob+ on the phone.

Finally, the AI has enough information to attempt to rent a car. The AI can carry out its own online search of its own database. At this point, the results may be returned to Bob, who can read them to the person, and describe the different options that have come up. Bob can then say "can I help you with any of these", and while the user is thinking, Bob can go on to another call. Again, if the user wants to do this, the user can deal with the simulated version of Bob, to arrange the reservation, enter their credit card and carry out whatever other thing is needed.

The above has described an embodiment for renting a car. However this can be used for purchasing other kinds of travel, buying items, comparing prices on certain items, and many other different things.

Another aspect of this system relates to the way in which the information is handled back and forth between the user and the operator. Many times, at the end of a call, the user has only a limited record of what happened during the call. The user may take contemporaneous notes, may write down the operator's name and time, but in the end, these are just notes. According to the present system, the computer is doing and guiding the operations, and in fact the computer is seeing what happens on both sides of the call: one side in which the computer is handling the operations, the other side in which the computer is listening and using its AI voice recognition to attempt to ascertain what the user is saying, verify what the user is saying, and eventually receive verification that misunderstands correctly. Thus, the computer has a record of both sides of the call.

According to an embodiment, a ledger of each call is created.

This starts at 300, where the system gets the user information. This can be done by getting the users name or number, from caller ID, by the user saying their name or number, a voiceprint, entering some unique identifications, such as a password or secret information, or the like. At 305, the system records/gets, both sides of the call, both what the user is asking for, and what the user is given. Rather than simply recording the call, this can record the information from the call. That is, rather than recording the audio, this may record the AI recognized things that the user says, the options given to the user in the user's choice from those options as well as what the system believes is the final result of the options.

At 310, the system creates a ledger that includes all of the information, the date and time of the call, the user information as well as the verification that the user is who they say they are, as well as the progression on both sides of the call. The ledger can be of the form the ledger can be for example in XML form, with the flag/user/xxx representing the user, and the remaining flags representing what happened during the call. In one embodiment, the flags can represent the time of the call, such as/T0:22 representing the time when something happens, followed by a text summary of what happened at that time, an example is, using the technique above, the first entry being </user=xxx, where XXX represents unique information indicative of the user, along with information indicative of the fact that the user's identity was verified. The system then says what you want to do, but there is no real need to record that, and so the next thing that the system might record is the user saying, at time t 0:22 "I want to rent a car". The system can record either the text of this as voice recognized, and perhaps also for certain more important things such as this can record the user's actual voice. Again, the system may ask a number of questions, but these questions are not particularly relevant the next entry then at time t 1:07, is as a result of going back and forth with the user, and voice recognizing what they want, saying "so you want a Ford focus, 11 one 2019 through 11 7 2019, pick up LA, drop San Francisco, and you agree to the price of hundred dollars. Is that correct? Again, the next result is the user saying yes, followed by the system saying after receiving the credit card, saying the terms of cancellation, for example you have until 3 days before to cancel or there will be $100 charge on your credit card you agree with this. The information in the ledger is used to form a hash or other signature which cryptographically verifies the ledger as having been correct and having been created by the computer. Hence, the XML ledger by itself forms a kind of evidence of the transaction including information about both sides of the transaction. All of this forms the ledger, and forms a specific entry in the ledger associated with the user XXX.

The ledger can be a ledger which includes information for all users, or can be a ledger for only the user XXX, and can be a distributed ledger, or a ledger that is only stored on the computer system, and in one embodiment, the ledger may be sent to the user is in XML file so that the user has a copy of the XML file that they can read, and while certain parts of the ledger cannot be read (such as a cryptographic one way hash which cryptographically forms a signature of the xml file which can be verified as being correct without having the key, but can only be written having the proper cryptographic key) this nonetheless forms a verification. Other forms of cryptographic verification can also be used. Verification is also carried out by the fact that there are multiple copies of the ledger.

In one embodiment, the ledger is distributed in the sense that each user receives copies of their own version of the ledger which only includes their own information. That is, the user xxx may store the information about the ledger on their own phone or computer and may store either the entire ledger as in a conventional distributed ledger, or may store only parts of the ledger on their own computer, that is, elements of the ledger are filtered by flag, and only the flags associated with or otherwise of interest to the user are stored by the user. The ledger is still distributed, since there is a copy both on the main server and on the computer, but only a part of the ledger is stored on the user's computer. For example, the user may filter only by flags which refer to the user himself, or to the user's phone number (thereby storing only flags that represent the user's family) or user who owns a business may store only the flags related to the user's own business.

Although only a few embodiments have been disclosed in detail above, other embodiments are possible and the inventors intend these to be encompassed within this specification. The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. For example, other kinds of applications can be used with the system, and in fact this forms a voice interface to any computer system which can allow the user to interact with the computer system without the user necessarily feeling like they are interacting with a computer. Thus, the present invention is not intended to be limited to the embodiments shown herein but is to be accorded the widest scope consistent with the principles and novel features disclosed herein.

What is claimed is:

1. A system of handling calls received from callers, comprising
   a computer, that receives a call from a caller over a channel,
   the computer which assigns a first operator to handle the call,
   the computer automatically recognizing at least one aspect of a voice from a caller, and automatically forms a response to be given to the caller based on the recognizing, where the computer controls the response to be given to the caller to be played to the caller using a simulated voice previously created by the first operator who is assigned to handle the call if the response is one which has been previously recorded by the first operator assigned to handle the call,
   and where the computer controls the response to be given to the caller to be routed to the first operator for the first operator to read the response, if the response is one which has not been previously recorded by the first operator assigned to handle the call.

2. The system as in claim 1, further comprising the computer providing background sound to the caller which interferes with the caller being able to determine that the caller has been placed on hold from the operator.

3. The system as in claim 2, wherein the sound is white noise.

4. The system as in claim 2, wherein the sound comprising averaged background noise, taken from the first operator's actual mouthpiece.

5. The system as in claim 1, further comprising the computer maintaining an electronic ledger of the call,
   where the ledger includes information about a recognized voice from the caller indicating what the user has said, and includes information about responses which were given to the caller, for each of a plurality of exchanges which occur during the call.

6. The system as in claim 5, wherein the ledger comprises a plurality of different entries, each entry being cryptographically verified.

7. The system as in claim 5, wherein the ledger is a distributed ledger that is stored by a number of different parties.

8. The system as in claim 1, wherein the first operator who is assigned to handle the call is a member of an operator group, the operator group comprising multiple different operators who have at least one voice characteristic in common, and where the call is sent to any operator in the operator group for the operator in the operator group to read.

9. A system of handling callers, comprising
a computer, that receives a call, and automatically recognizes at least one aspect of a voice from a caller, and automatically forms a response to be given to the caller based on the recognizing, where the response is provided to the caller, and where the computer maintains a ledger of the call, where the ledger includes information about recognized voice from the caller, and responses which were given to the caller, for each of a plurality of exchanges which occur during the call.

10. The system as in claim 9, wherein the ledger comprises a plurality of different entries, each of the entries being cryptographically verified.

11. The system as in claim 10, wherein the user receives controls to enable the user to select which of the entries are stored by the ledger.

12. The system as in claim 9, wherein the ledger is a distributed ledger stored by a number of different parties.

13. The system as in claim 9, wherein the computer assigns a first operator to handle the call,
the computer automatically recognizing information from the caller's voice,
and the computer forms a response to be given to the caller based on recognizing the information, and the computer controls the response to be played to the caller using a simulated voice associated with the first operator who is assigned to handle the call if the response is one which has been previously recorded by the operator assigned to handle the call,
and the computer controls the response to be routed to the first operator for the first operator to read the response, if the response is one which has not been previously recorded by the first operator assigned to handle the call.

14. The system as in claim 13, wherein the first operator who is assigned to handle the call is a member of an operator group, the operator group comprising multiple different operators who have at least one voice characteristic in common, and where the call is sent to any operator in the operator group for the operator in the operator group to read.

15. The system as in claim 9, further comprising the computer providing background sound to the caller which interferes with the caller being able to determine that the caller has been placed on hold from the operator, wherein the background sound is an averaged background noise taken from a background of the operator.

16. A system of handling calls received from callers, comprising
a computer, that receives a call from a caller over a channel,
the computer which assigns a first operator to handle the call,
wherein the first operator who is assigned to handle the call is part of an operator group, the operator group comprising multiple different operators who have at least one voice characteristic in common,
where the computer automatically recognizes voice from a caller, and automatically forms a response to be given to the caller, based on the recognized voice,
where the computer controls the response to be given to the caller to be played to the caller using a simulated voice previously created by the operator who is assigned to handle the call if the response is one which has been previously recorded by the operator assigned to handle the call,
and where the computer controls the response to be routed to any operator in the operator group for the operator in the operator group to read the response, if the response is one which has not been previously recorded by the operator assigned to handle the call.

17. The system as in claim 16, further comprising the computer providing sound to the caller which interferes with the caller being able to determine that the caller has been placed on hold from the operator.

18. The system as in claim 17, wherein the sound is a sound comprising an averaged sound of multiple people speaking in the background.

19. The system as in claim 17, further comprising the computer maintaining an electronic ledger of the call, where the ledger includes information about a recognized voice from the caller indicating what the user has said, and includes information about responses which were given to the caller, for each of a plurality of exchanges which occur during the call.

20. The system as in claim 19, wherein the ledger comprises a plurality of different entries, each entry being cryptographically verified and wherein the user receives controls to enable the user to select which entries are stored by the ledger.

* * * * *